United States Patent [19]

Kaule et al.

[11]  4,446,204
[45]  May 1, 1984

[54] SECURITY PAPER WITH AUTHENTICITY FEATURES

[75] Inventors: Wittich Kaule, Gauting; Gerhard Schwenk, Puchheim; Gerhard Stenzel, Munich, all of Fed. Rep. of Germany

[73] Assignee: GAO Gesellschaft fur Automation und Organisation mbH., Munich, Fed. Rep. of Germany

[21] Appl. No.: 314,841

[22] PCT Filed: May 29, 1981

[86] PCT No.: PCT/DE81/00082

§ 371 Date: Oct. 23, 1981

§ 102(e) Date: Oct. 23, 1981

[87] PCT Pub. No.: WO81/03511

PCT Pub. Date: Dec. 10, 1981

[30] Foreign Application Priority Data

May 30, 1980 [DE] Fed. Rep. of Germany ....... 3020653

[51] Int. Cl.$^3$ .......................... B32B 5/16; G06K 9/74
[52] U.S. Cl. .................... 428/323; 428/333;
428/403; 428/438; 428/464; 428/693; 428/537;
428/900; 428/916; 428/913; 428/917; 428/918;
356/71; 235/493; 250/569; 162/138; 162/140
[58] Field of Search ............... 428/900, 333, 916, 917,
428/918, 913, 438, 464, 693, 323

[56] References Cited

U.S. PATENT DOCUMENTS 3,447,851  6/1969  Remeika et al. .
3,480,877  11/1969  Dillon et al. .
3,612,835  10/1971  Andrews .
4,013,894  2/1977  Foote et al. .
4,100,011  7/1978  Foote ............................ 428/916 X
4,244,932  1/1981  Basile et al. ..................... 428/403 X
4,263,374  4/1981  Glass et al. ..................... 428/900 X
4,337,521  6/1982  Blank et al. ..................... 428/900 X

FOREIGN PATENT DOCUMENTS 843660    8/1951   Fed. Rep. of Germany .
2623708  12/1976   Fed. Rep. of Germany .
2754267   6/1978   Fed. Rep. of Germany .
588740    6/1977   Switzerland .
703498    2/1954   United Kingdom .
1514758   6/1978   United Kingdom .
1585533   3/1981   United Kingdom .

OTHER PUBLICATIONS

Aomi, K. et al., Japanese Appln., 3870478, Abstract from the "Bulletin of the Institute of Paper Chemistry," vol. 51, No. 5, Nov. 1980, p. 55, Abst. 5054.
Bobeck et al., "Magnetic Bubbles", Selected Topics in Solid State Physics, 1975.
Dobrowolski et al., "Optical Interference Coatings for Inhibiting of Counterfeiting", Optica Acta, v. 20, #12, 1973, pp. 925–937.

Primary Examiner—P. Ives
Attorney, Agent, or Firm—Schwartz, Jeffery, Schwaab, Mack, Blumenthal & Koch

[57] ABSTRACT

Security paper with authenticity characteristics embodied therein or printed thereon which are both ferrimagnetic and also only slightly absorbed in the infrared spectral region.

The presence of both properties at the same position on the security paper is tested, wherein both tests can preferably be carried out simultaneously. Materials which show this rare combination of properties are some ferrites, ferrimagnetic garnet compounds and the so-called green ferromagnetic compounds.

14 Claims, No Drawings

SECURITY PAPER WITH AUTHENTICITY FEATURES

BACKGROUND OF THE INVENTION

The present invention relates to a security paper with authenticity features in the form of coloring agents with magnetic properties added thereto or applied thereon.

It is already known to print security papers i.e. bank notes, pass cards, documents and the like with magnetic inks or to embed magnetizable material in them. Security papers prepared in this way can, following corresponding magnetic excitation, be surveyed by automatic machinery and checked for their authenticity. As suitable magnetizable materials preferably oxidic iron compounds such as γ-ferric oxide or ferrosoferric oxide or also ferrites are used. These compounds have in each case a particular color, wherein the material becomes darker the stronger its magnetic properties are (German Patent Specification No. 843 660).

Although providing security papers with magnetic inks and/or authenticity features constitutes a substantial step forward in the direction of automatically acceptable bank notes or an automatically acceptable security paper, a check or evaluation of the magnetic properties of the security paper is insufficient by present day security standards. In recent times it has become more and more a question of testing the bank notes with non-visible electromagnetic radiation and thereby of undertaking particular checks. Since a series of printing inks used in bank note printing practically do not absorb in the IR-region of the optical spectrum, i.e. in this range appear colorless (IR-colourless) or "white" (IR-white), it has already been proposed to irradiate bank notes printed in this way with IR-light and to evaluate the proportion of the irradiation remitted. With this process it is possible to determine the condition of a bank note independently of the printed images over which the test trace passes. Since contamination in the IR-region of the spectrum shows the same optical properties as in the case of irradiation with visible light, in this way the degree of contamination can be determined uninfluenced by the particular printed image. This type of testing process requires security papers with prints on them from the printing inks already mentioned which are correspondingly translucent in the IR-region of the spectrum.

There have also already been tests to develop magnetic coatings which in the visible region of the spectrum are translucent so that corresponding use is not particularly noticed by the naked eye. A forger could in such cases overlook such coatings and accordingly make an attempt at forgery obvious (British Patent Specification No. 1 514 758). In the scientific world however the view is that the materials noted are ferromagnetic only at very low temperatures. Use of the materials in magnetic inks in security papers accordingly does not appear to be useful.

It is further known to use the semi-transparency of some magnetic materials in the IR-region of the spectrum in order to detect reflective markings lying below a magnetic data trace by corresponding irradiation. The application of information on to a data track however requires a magnetic material with a remanence of a particular degree. The known magnetic materials which have the required remanence indeed remain, applied in thin layers, somewhat transparent in the IR-region of the spectrum so that, for example, an IR-radiation reflecting element arranged underneath a data track can still be detected. However, this cannot be considered as IR colorlessness in the inventive sense, which lies substantially in the region of the IR-colorlessness of the paper carrier for IR-radiation and accordingly also permit measurements of contamination (German Offenlegungsschrift No. 26 23 708).

Further a magnetic card is known from Swiss Patent Specification No. 588 740 in which an optical property of the magnetic data trace can be used for authenticity testing. However, also in this case, known magnetic operating materials are used for writing data on the card. These materials do not have the optical properties which are a prerequisite for the solution of the problem according to the present invention, which in particular are not sufficiently translucent in the IR.

In summary, it was accordingly known for carrying out particular tests to print security papers with inks which absorbed little in the IR-region of the spectrum. These materials however did not have any magnetic properties. On the other hand it was known to render security documents secure with magnetic materials. These magnetic materials however absorb over the whole optical spectral region even into the infrared relatively strongly. The combination of magnetic and transmission properties accordingly runs into difficulties.

SUMMARY OF THE INVENTION

The problem underlying the invention is to provide a security paper with authenticity features in the form of added or applied coloring agents which on the one hand make it possible to check the IR-transmission properties of the security paper, if appropriate, even in the printed image, and on the hand have magnetic properties, wherein both IR Transmission and magnetic tests can be uninfluenced by one another but are capable of being carried out at the same position on the security paper.

In accordance with the invention this problem is solved in that the coloring agents absorb infrared radiation at least in a specific spectral region less than or substantially to the same extent as the paper carrier itself.

DETAILED DESCRIPTION OF THE PREFERRED EMBODIMENTS

Preferably the coloring agents have in the IR-region of the spectrum an "optical window" i.e. the transmissivity for infrared radiation or the absorption coefficient falls steeply at least at the shortwave boundary of the region substantially to the value of the paper carrier.

Preferably the coloring agents consist of a ferrimagnetic garnet compound of the formula $M_3Fe_5O_{12}$ or the coloring agents include such a compound, wherein M represents a bismuth or a rare earth metal ion. Obviously mixed crystals derived therefrom can also be used.

For improving the transmissivity in the visible region of the optical spectrum iron (Fe) can also be substituted by other elements. Such coloring agents can then be added without restriction to light printing inks.

Thus ferrimagnetic garnet compounds of the general formula $M_{3-2x}M'_{2x}Fe_{5-x}V_xO_{12}$ can be used; in this x can take up values between 0 and 1.2, M is a rare earth metal or bismuth and M' stands for calcium, magnesium, strontium or barium.

This mixed garnet has accordingly the structure of the YIGs or YAGs known for a long time (yttrium iron garnets or yttrium aluminium garnets respectively) wherein yttrium is partly or totally substituted by the elements M and M' from the group of materials noted, insofar as the lattice component iron is partially replaced by vanadium.

Furthermore ferrimagnetic garnet compounds corresponding to the general formula $M_{3-x}M'_xFe_{5-x}M''_xO_{12}$ correspond to the requirements according to the invention; in this x can take up values between 0 and 3, M denotes a rare earth metal or also bismuth, M' is an element from the group calcium, strontium, barium, magnesium, zinc, cadmium and M" is an element from the group silicon, germanium, tin and tellurium.

These compounds correspond to the YIG (yttrium iron garnet) known for a long time wherein yttrium here is substituted wholly or partially by M and M' from the groups of materials noted and for charge compensation iron is replaced by a tetravalent element M" as given.

Finally also suitable are garnet compounds of the general formula $M_3Fe_{5-x}M'_xO_{12}$, wherein x can take up values between 0 and 5, wherein M stands for a bismuth or rare earth metal ion and M' denotes an element from the group aluminium, gallium and indium.

Also these compounds are derived from YIG, wherein in this case yttrium can be replaced by the noted element M and the lattice component iron is substituted by the trivalent element M' as given.

The above noted iron garnets have in the IR a highly translucent region which lies substantially between 0.7 and 10 $\mu m$.

Apart from the garnet compounds, also suitable are ferromagnetic compounds which on the basis of their green color are classified in technical literature as "green ferromagnets". We name from this group the pigment iron borate $FeBO_3$, which in the region of 0.97 $\mu m$ to 1.29 $\mu m$ has a sufficient transmission and the soluble iron fluoride $FeF_3$, which in the region of 0.7 $\mu m$ to 2.5 $\mu m$ has an absorption coefficient less than 1 $cm^{-1}$.

Less IR-translucent but still suitable for a series of papers and within the scope of the above definition according to the invention are also compounds from the class of ferrites. We name $Li_{0.5}Fe_{2.5}O_4$ (lithium ferrite) or $MgFe_2O_4$ (magnesium ferrite) which in the region of about 5 $\mu m$ have an absorption coefficient less than 100 $cm^{-1}$ or 10 $cm^{-1}$ respectively.

The materials according to the invention also open up the possibility of doping with rare earth metals wherein the ions embedded in the host lattice e.g. are stimulated in the visible region of the spectrum and have in the "optical window" a narrow band of fluorescence emission. These emission lines can be quantitatively measured and constitute a further valuable authenticity feature of the security paper.

The materials noted are known as such. They are used in the form of single crystals, as solid body lasers, as light modulators with a magneto-optical interaction or as magnetic storage media (bubbles) and are described for example in U.S. Pat. No. 3,447,851 (modulator) as well as in U.S. Pat. No. 3,480,877 (laser) and in Bobeck A. H., Della Torre E. "Magnetic Bubbles" New York 1975 (bubbles). Advice to use these materials in powder form as IR-translucent magnetic pigments for rendering security documents secure is not to be taken from the literature.

With the invention the interesting possibility is opened up for security papers of measuring their magnetic properties while maintaining customary IR-transparent printed images. Thereby advantageous combinations are made possible, for example a special fluorescence in the region of the IR-window and simultaneously magnetic properties can be measured both only on a single feature material. Also the manufacture of security papers correspondingly rendered secure is accordingly simplified.

The coloring agents can, for example, be mixed in with a steel gravure printing ink manufactured according to normal processes. It is also possible to coat a security thread previously embedded in the security paper with a coloring agent or also to color mottling fibres introduced into the paper pulp with the material according to the invention.

The manufacture of a suitable garnet compound for the security papers according to the invention is subsequently described in more detail with reference to two Examples.

EXAMPLE NO. 1

An erbium-activated yttrium-aluminium/iron mixed garnet was manufactured $$Y_{2.82}Fe_{3.6}Al_{1.4}O_{12}:Er_{0.18}$$

63.67 g yttrium oxide $Y_2O_3$, 6.88 g erbium oxide $Er_2O_3$, 57.5 g iron oxide $Fe_2O_3$, 14.3 g aluminium oxide $Al_2O_3$ and 45 g anhydrous sodium sulphate $Na_2SO_4$ were carefully filled into an aluminium oxide crucible and calcined for 14 hours at 1100° C. After cooling the reaction product was disintegrated with water, the fluxing agent washed out and the reaction product then dried at a 100° C. in air. To achieve the finest grain size possible the powder was thereafter milled in a stirring ball mill. A light green powder was obtained with an average particle size of 1 $\mu m$ which shows sufficient transparency in the IR-region and a ferrimagnetic.

EXAMPLE NO. 2

A gadolinium iron garnet was manufactured $$Gd_3Fe_5O_{12}$$

108.75 gadolinium oxide $Gd_2O_3$, 79.8 g iron oxide $Fe_2O_3$ and 70 g sodium sulphate $Na_2SO_4$ were intimately mixed and heated in air in a corundum crucible at 1000° C. for 10 hours.

After cooling the sintered product was milled and calcined for a further 10 hours at a 1100° C.

After cooling and renewed milling the fluxing agent sodium sulphate $Na_2SO_4$ was washed out with water and the resulting material micronised in a stirring ball mill.

After digesting with water and alcohol it was dried for 4 hours at 120° C.

A green powder with an average particle size of below 1 $\mu m$ was obtained which showed in the IR-region a sufficient transparency. The ferrimagnetic properties of the powder are to be determined with customary devices e.g. with field plates.

By doping with erbium additional luminescence emissions in the IR-region can be achieved; in place of 108.75 g gadolinium oxide $Gd_2O_3$ there are added in the above noted recipe only 101.58 g thereof and accordingly additionally 7.65 g erbium oxide $Er_2O_3$ are to be mixed in. The powder so obtained corresponds both in its optical and also in its magnetic properties to the undoped one, but additionally shows a fluorescence emission at 1.5 μm which can be detected with suitable known testing devices.

Subsequently the manufacture of a printing ink with the coloring agents according to the invention is described by way of example.

100 g alkyd resin, 20 g cobalt naphthenate, 50 g scouring paste, 190 g linseed oil, 160 g maleic resin and 180 g high boiling mineral oil were intimately mixed on a three-roll mill. To this varnish were added 100 g of the coloring agent according to the preceding Example and 100 g of a colored pigment to obtain a particular color tone e.g. Permanent Yellow H10G, Hansa Red 3B, Hostaperm Green 8G or Hostaperm Blue AR (all registered Trade Marks on the firm of Hoechst). Varnish, colored pigment and the coloring agent according to the invention were intimately mixed on the three-roll mill. The printing ink obtained demonstrated its suitability for bank note guilloche printing. They can be used in all printing techniques which are used for printing securities, particularly for steel gravure printing.

A preferred testing method for security papers with authenticity characteristics according to the invention is checking undertaken simultaneously and at the same place of the magnetisability and IR-transparency which, if desired, can further be supplemented by a corresponding measurement of the absorption in the visible spectral region.

Suitable testing devices for carrying out this process are basically known.

Thus, already, U.S. Pat. No. 3,612,835 describes a measuring head with which simultaneously and at the same position the magnetic properties and also the absorption in the visible spectral region can be measured. For this the gap in the magnetic head is filled with a transparent material which extends up to a Si-photodiode built into the interior of the magnetic head.

With small modifications this test head can also be used as a testing device for security papers according to the invention. For this the material which is transparent in the visible region and arranged in the magnetic gap is replaced by an IR-transparent VIS-absorbing material e.g. a glass such as Schott RG 1000 (Trade Mark) or silicon or germanium. These materials are non-transparent in the visible at the material thicknesses used but in the IR have from wavelengths from 1.1 μm or 1.6 μm respectively a window of high transparency.

In order to match the detector to the differently lying spectral region, the Si-photodetector provided in U.S. Pat. No. 3,612,835 is replaced if necessary by a photodetector also sensitive in the long wave I.R. e.g. a PbS-photo-resistance.

As illumination source there can be used for example an incandescent lamp.

The test head so constructed senses in the region of the yoke gap the magnetisation and the IR-absorption. By means of the evaluation electronics it is determined whether at the measured position both magnetisability and IR permeability are present.

The Example described above should not restrict the range of application of the invention in any way. Rather all those materials are to be considered as part of the invention which on the one hand have a highly transparent window in the IR-region and on the other show ferro- or ferrimagnetic properties. Such materials can also be chosen from the group of rare earth orthoferrites, the rare earth iron perovskites and also the alkaline earth ferrites after carrying out appropriate tests.

What is claimed is:

1. A security document with authenticity features, comprising: a carrier material having a known infra-red absorption characteristic; and a coloring agent having magnetic properties for enabling magnetic verification of said security document to be conducted, said coloring agent having an infra-red absorption characteristic such that in at least one given spectral region said coloring agent absorbs infra-red radiation less than or substantially to the same extent as said carrier material.

2. A security document according to claim 1 wherein the transmission curve for infra-red radiation at the shortwave boundary of said spectral region changes with characteristic structure.

3. A security document according to claim 1 wherein said coloring agent comprises a ferrimagnetic garnet compound of the general formula $M_{3-2x}M'_{2x}Fe_{5-x}V_xO_{12}$ wherein x has a value between 0 and 1.2, wherein M denotes a rare earth metal or bismuth and wherein furthermore M' is an element selected from the group consisting of calcium, magnesium, strontium and barium.

4. A security document according to claim 1 wherein said coloring agent comprises a ferrimagnetic garnet compound of the general formula $M_{3-x}M'_xFe_{5-x}M''_xO_{12}$, wherein x has a value from 0 to 3, wherein M is an element selected from the group consisting of the rare earth metals and wherein furthermore M' is an element selected from the group consisting of calcium, strontium, barium, magnesium, zinc and cadmium and M'' is an element selected from the group consisting of silicon, germanium, tin and tellurium.

5. A security document according to claim 1 wherein said coloring agent comprises a ferrimagnetic garnet compound of the general formula $M_3Fe_{5-x}M'_xO_{12}$, wherein x has a value from 0 to 5, wherein M is an element selected from the group consisting of the rare earth metals and bismuth, and M' is an element selected from the group consisting of aluminium, gallium and indium.

6. A security document according to claim 1 wherein said given spectral region lies between 0.7 μm and 10 μm.

7. A security document according to claim 1 wherein said coloring agent comprises a ferrimagnetic garnet compound doped with rare earth metals such that, on excitation, said compound emits radiation in a predetermined spectral band.

8. A security document according to claim 1 wherein said coloring agent comprises a green ferromagnetic compound.

9. A security document according to claim 8 wherein the green ferromagnetic compound comprises iron borate $FeBO_3$.

10. A security document according to claim 8 wherein the green ferromagnetic compound comprises iron fluoride $FeF_3$.

11. A security document according to claim 1 wherein said coloring agent comprises a compound belonging to the group of ferrites.

12. A security document according to claim 11 wherein said compound belonging to the ferrites is $Li_{0.5}Fe_{2.5}O_4$ (lithium ferrite).

13. A security document according to claim 11 wherein said compound belonging to the ferrites is $MgFe_2O_4$ (magnesium ferrite).

14. A security document according to claim 8 through 13 wherein said given spectral region lies between 0.7 μm and 10 μm.

* * * * *